J. HOLTZMAN & A. GEFFON.
ATTACHABLE DRIVING MACHINE FOR VEHICLES.
APPLICATION FILED JULY 30, 1915.

1,201,734.

Patented Oct. 17, 1916.

Witnesses:

Inventors

UNITED STATES PATENT OFFICE.

JOHN HOLTZMAN AND ABRAHAM GEFFON, OF NEW YORK, N. Y.

ATTACHABLE DRIVING-MACHINE FOR VEHICLES.

1,201,734.

Specification of Letters Patent.

Patented Oct. 17, 1916.

Application filed July 30, 1915. Serial No. 42,682.

*To all whom it may concern:*

Be it known that we, JOHN HOLTZMAN and ABRAHAM GEFFON, both residents of the city of New York, in the county of New York and State of New York, have invented a certain new and useful Attachable Driving-Machine for Vehicles, of which the following is a specification.

This invention relates to attachable motor-operated machines for driving vehicles that are normally propelled by different means, and particularly to attachable driving machines for pedal-operated bicycles.

The principal object of the invention is to provide a simple, inexpensive, and improved driving machine of this type that may be readily, rapidly, and conveniently attached to and detached from the vehicle, that may be readily, rapidly and conveniently adjusted in accurate operating relation with the wheels of the vehicle, and with the utilization of which the vehicle may be propelled with improved effectiveness.

Other objects and advantages will hereinafter appear.

Figure 1:
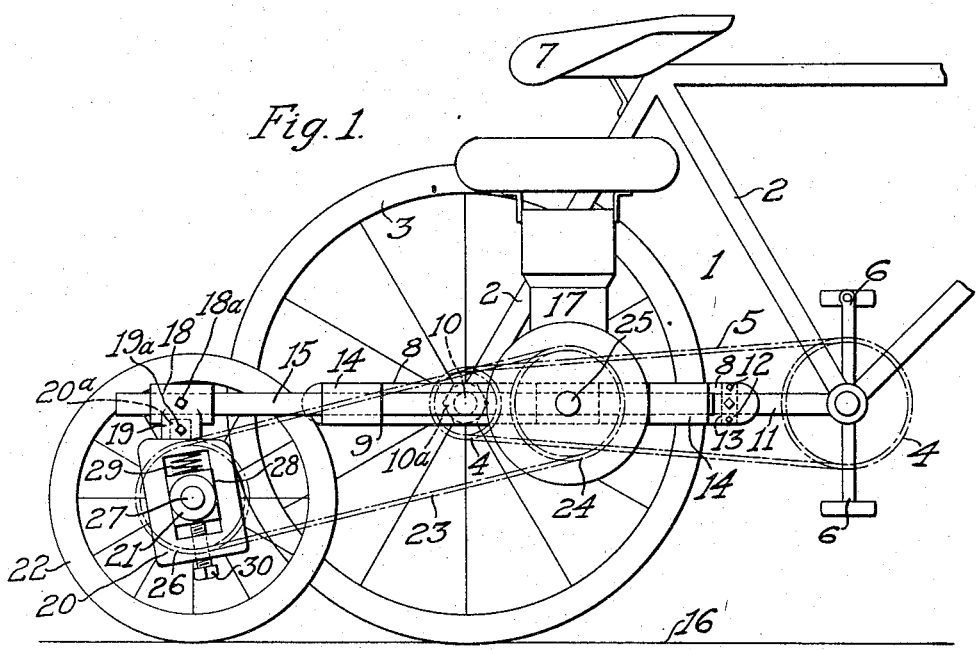
Figure 2:
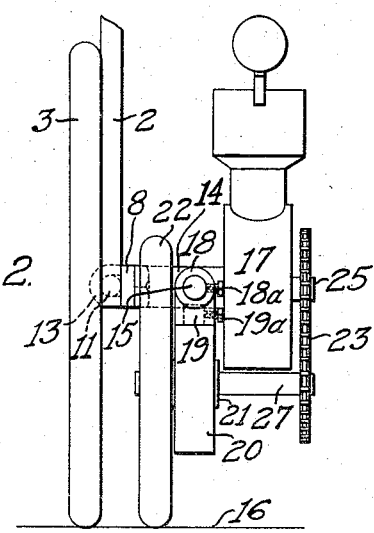

In the accompanying drawings,—Figure 1 is a general front elevation of the driving machine showing it attached to a pedal-operated bicycle. Fig. 2 is a rear end elevation of the driving machine shown in Fig. 1.

The bicycle 1, of which the rear half only is here shown, comprises a tubular framework 2 which carries a rear-end wheel 3 that is normally driven by means of sprocket-wheels 4 and a sprocket-chain 5 that are operated by pedal-bars 6, which are revolved by the feet of the operator who is situated astride upon the seat 7. A bar 8 of the driving-machine framework 9 is secured at one place, between its extremities, to the bicycle framework by means of the wheel-stud 10 passing through the bar 8 and a nut 10$^a$ threading over the stud, and one extremity of the bar 8 is secured to the horizontal framework-rod 11 that extends between the centers of wheels 3, 4, by means of bolts 12 passing through said bar and into the ends of a strap 13 which embraces the rod 11. Brackets 14 extending from the bar 8 carry a round bar 15 which passes therethrough and is secured thereto in a position parallel to the framework-rod 11 and horizontally with or parallelly to the ground 16. A gasolene motor 17 is secured to the bar 15 at a point between the centers of wheels 3, 4, whereby its weight is transmitted upon and is carried directly by the rod 11 of framework 2. At the rear end of bar 15 is mounted a sleeve 18 having a hub 19 to which is secured a frame 20 having therein mounted a bearing-box 21 that carries a driving-wheel 22 for propelling the bicycle 1. The sleeve 18 is held upon rod 15 by a set-screw 18$^a$ passing therethrough and threading against said rod, and the frame 20 is secured to the hub 19 by means of a set-screw 19$^a$ passing through the hub and threading against a lug 20$^a$ forming part of the frame 20. A sprocket chain 23 connects a sprocket-wheel 24 fixed to motor-shaft 25 with a sprocket wheel 26 which is fixed upon a drive-shaft 27 of the propelling-wheel 22, whereby the latter wheel is driven from the gasolene motor 17 to propel the bicycle.

The bearing-box 21 is slidable upwardly and downwardly in guiding-ways 28 of frame 20, and a spring 29 in frame 20 bears downwardly upon the bearing-box 21 and thereby tends to maintain the lower periphery of the propelling-wheel 22 below that of the bicycle wheel 3, but by the weight of the bicycle forcing the wheel 22 back upwardly it is caused to press forcibly and resiliently against the ground 16. In this manner a strong, positive, and proper resilient friction is exerted between the periphery of wheel 22 and the ground, which results in effective propulsion of the bicycle. A set-screw 30 threads through the lower part of frame 20 and against the bearing-box 21, wherewith the propelling wheel 22 may be shifted upwardly contrary to the pressure of spring 29, and the extension of its periphery below that of wheel 3 and the degree of pressure exerted downwardly by said wheel, through the action of spring 29, may be thereby regulated or adjusted to secure proper frictional contact thereof with the ground and consequent effective propulsion of the bicycle. The upward and downward means of adjustment of wheel 22 is also advantageous where the different bicycles to which the driving machine may be attached have their wheels of slightly different diameters, in each of which cases the wheel may be adjusted to bear against the ground with the desired degree of friction.

When attaching the driving machine to the bicycle its propelling wheel 22 may be set in accurate parallelism with the bicycle wheel 3 by means of unthreading the set-screw 18ª, whereby the wheel 22 may be swung about the horizontal axis of rod 15 until adjusted to a position which is parallel to the wheel 3. The set-screw 18ª may be then tightened to maintain the wheel 22 in adjusted position. Further adjustment of the parallelism of the wheels 22, 3 may be secured by means of unthreading the set-screw 19ª and swinging the wheel about the vertical axis of hub 19 and lug 20ª until it is adjusted accurately to a position parallel to the bicycle-wheel 3. By unthreading the set-screw 18ª the sleeve 18 may be slid along the rod 15 and the distance between the centers of wheels 22, 3 thereby varied to provide for the use of different lengths of chain 23, and to affect the improved propulsion of the bicycle through adjustment of the distance of the propelling-wheel from the propelled bicycle in accordance with the requirements of each particular type of bicycle to which the driving machine may be attached.

Variations may be resorted to within the scope of the invention, and portions of the improvements may be used without others.

Having thus described our invention, we claim:—

1. The combination of a frame adapted to be rigidly secured to a vehicle frame, a motor carried by said frame whereby its weight is borne by said frame and vehicle-frame, an auxiliary driving wheel for the vehicle mounted on said frame, means to drive said wheel from said motor, means to swing said wheel about a vertical axis to adjust it in parallelism with one of the vehicle-wheels, means to swing said wheel about a horizontal axis to adjust it in parallelism with said vehicle-wheel, means to adjust the axis of said wheel in a direction toward and away from the axis of said vehicle-wheel, a spring pressing said wheel to maintain its periphery lower than the vehicle wheels, and means to adjust said wheel in a direction contrary to the pressure of said spring.

2. The combination of a frame adapted to be rigidly secured to the vehicle-frame, a motor carried by said frame whereby its weight is borne by said frame and vehicle-frame, an auxiliary driving-wheel for the vehicle mounted on said frame, means to drive said wheel from said motor, means to swing said wheel about a vertical axis to adjust it in parallelism with one of the vehicle-wheels, means to swing said wheel about a horizontal axis to adjust it in parallelism with said vehicle wheel, means to adjust the axis of said wheel in a direction toward and away from the axis of said vehicle-wheel, and a spring pressing said wheel to maintain its periphery lower than the vehicle wheels.

3. The combination of a frame adapted to be rigidly secured to the vehicle frame, a motor carried by said frame whereby its weight is borne by said frame and vehicle-frame, an auxiliary driving wheel for the vehicle mounted on said frame, means to drive said wheel from said motor, means to swing said wheel about a vertical axis to adjust it in parallelism with one of the vehicle-wheels, means to swing said wheel about a horizontal axis to adjust it in parallelism with said vehicle-wheel, and means to adjust the axis of said wheel in a direction toward and away from the axis of said vehicle-wheel.

4. The combination of a frame adapted to be rigidly secured to the vehicle frame, a motor carried by said frame whereby its weight is borne by said frame and vehicle-frame, an auxiliary driving-wheel for the vehicle mounted on said frame, means to drive said wheel from said motor, means to swing said wheel about a vertical axis to adjust it in parallelism with one of the vehicle-wheels, and means to swing said wheel about a horizontal axis to adjust it in parallelism with said vehicle-wheel.

5. The combination of a frame adapted to be rigidly secured to the vehicle-frame, a motor carried by said frame whereby its weight is borne by said frame and vehicle-frame, an auxiliary driving wheel for the vehicle mounted on said frame, means to drive said wheel from said motor, and means to swing said wheel about a vertical axis to adjust it in parallelism with one of the vehicle-wheels.

6. The combination of a frame adapted to be secured to a vehicle-frame, a motor, an auxiliary driving-wheel for the vehicle driven by said motor, means to swing said wheel about a vertical axis to adjust it in parallelism with one of the vehicle-wheels, means to swing said wheel about a horizontal axis to adjust it in parallelism with said vehicle-wheel, means to adjust the axis of said wheel in a direction toward and away from the axis of said vehicle-wheel, a spring pressing said wheel to maintain its periphery lower than the vehicle wheels, and means to adjust said wheel in a direction contrary to the pressure of said spring.

7. The combination of a frame adapted to be secured to a vehicle-frame, a motor, an auxiliary driving-wheel for the vehicle driven by said motor, means to swing said wheel about a vertical axis to adjust it in parallelism with one of the vehicle-wheels, means to swing said wheel about a horizontal axis to adjust it in parallelism with said vehicle-wheel, means to adjust the axis of said wheel in a direction toward and away from the axis of said vehicle-wheel, and a spring pressing said wheel to maintain its periphery lower than the vehicle wheels.

8. The combination of a frame adapted to be secured to a vehicle-frame, a motor, an auxiliary driving-wheel for the vehicle driven by said motor, means to swing said wheel about a vertical axis to adjust it in parallelism with one of the vehicle wheels, means to swing said wheel about a horizontal axis to adjust it in parallelism with said vehicle-wheel, and means to adjust the axis of said wheel in a direction toward and away from the axis of said vehicle-wheel.

9. The combination of a frame adapted to be secured to a vehicle-frame, a motor, an auxiliary driving-wheel for the vehicle driven by said motor, means to swing said wheel about a vertical axis to adjust it in parallelism with one of the vehicle-wheels, and means to swing said wheel about a horizontal axis to adjust it in parallelism with said vehicle-wheel.

10. The combination of a frame adapted to be secured to a vehicle frame, a motor, an auxiliary driving wheel for the vehicle driven by said motor, and means to swing said wheel about a vertical axis to adjust it in parallelism with one of the vehicle-wheels.

11. The combination of a frame adapted to be rigidly secured to a vehicle-frame, a motor carried by said frame whereby its weight is borne by said frame and vehicle-frame, an auxiliary driving-wheel for the vehicle mounted on said frame, means to drive said wheel from said motor, and means to swing said wheel about a horizontal axis to adjust it in parallelism with said vehicle-wheel.

12. The combination with a frame adapted to be rigidly secured to a vehicle-frame, a motor carried by said frame whereby its weight is borne by said frame and vehicle-frame, an auxiliary driving wheel for the vehicle mounted on said frame, means to drive said wheel from said motor, and means to adjust the axis of said wheel in a direction toward and away from the axis of said vehicle-wheel.

13. The combination of a frame adapted to be rigidly secured to a vehicle-frame, a motor carried by said frame whereby its weight is borne by said frame and vehicle-frame, an auxiliary driving-wheel for the vehicle mounted on said frame, means to drive said wheel from said motor, and a spring pressing said wheel to maintain its periphery lower than the vehicle-wheels.

14. The combination of a frame adapted to be rigidly secured to a vehicle-frame, a motor carried by said frame whereby its weight is borne by said frame and vehicle-frame, an auxiliary driving-wheel for the vehicle mounted on said frame, means to drive said wheel from said motor, a spring pressing said wheel to maintain its periphery lower than the vehicle-wheels, and means to adjust said wheel in a direction toward and away from said spring.

15. The combination of a frame adapted to be rigidly secured to a vehicle-frame, a motor carried by said frame whereby its weight is borne by said frame and vehicle-frame, an auxiliary driving wheel for the vehicle mounted on said frame, means to drive said wheel from said motor, means to adjust the axis of said wheel in a direction toward and away from the axis of said vehicle-wheel, a spring pressing said wheel to maintain its periphery lower than the vehicle-wheel, and means to adjust said wheel in a direction contrary to the pressure of said spring.

16. The combination of a frame adapted to be rigidly secured to a vehicle-frame, a motor carried by said frame whereby its weight is borne by said frame and vehicle-frame, an auxiliary driving-wheel for the vehicle mounted on said frame, means to drive said wheel from said motor, means to swing said wheel about a horizontal axis to adjust it in parallelism with said vehicle-wheel, means to adjust the axis of said wheel in a direction toward and away from the axis of said vehicle-wheel, a spring pressing said wheel to maintain its periphery lower than the vehicle wheel, and means to adjust said wheel in a direction contrary to the pressure of said spring.

17. The combination with a vehicle wherein balance is maintained wholly by the rider, of a frame, a motor attached thereto, a rear wheel, an auxiliary wheel driven by said motor, and a spring to keep said latter wheel under tension.

18. The combination with a vehicle wherein balance is maintained wholly by the rider, of a frame, a motor attached thereto, a rear wheel, an auxiliary wheel driven by said motor, and a spring to keep said latter wheel in operative state.

Signed at the city of New York, in the county of New York and State of New York, this 26th day of July, A. D. 1915.

JOHN HOLTZMAN.
ABRAHAM GEFFON.

Witnesses:
JOSEPH KLEINBERG,
B. ROMAN.